2,781,345

6-AMINO-7,8-BENZOCARBOSTYRILS

Julian Jacob Leavitt, Plainfield, and Robert Sidney Long, Bound Brook, N. J., assignors to American Cyanamid Company, New York, N. Y., a corporation of Maine No Drawing. Original application January 26, 1954, Serial No. 406,358. Divided and this application April 15, 1955, Serial No. 501,724

3 Claims. (Cl. 260—288)

This invention relates to new intermediates for azo dyes and is a division of my copending application Serial No. 406,358, filed January 26, 1954. More specifically the present invention relates to compounds having the structure:

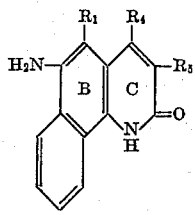

in which $R_1$ is a member of the group consisting of hydrogen, halogen, phenyl, lower alkyl and lower alkoxy radicals; $R_4$ is a member of the group consisting of hydrogen, lower alkyl and phenyl radicals; $R_5$ is a member of the group consisting of hydrogen and lower alkyl radicals; and $R_4$ and $R_5$ together may form a cyclohexane ring.

In the past it has been difficult to find new fundamental structures which are easily varied to give a variety of shades of azo dyestuffs. Many attempts have been made to find a new class of amino compounds which are easily prepared from readily available and easily substituted intermediates which permit a substituent present and which will give a wide range of shades when coupled onto the usual coupling components. Those that have been found have many times been deficient in dyeing properties such as fastness to light or washing. Since azo dyes have been known for a long time, and since much work has been expended on new amino compounds to be used therein, it is a great contribution to the art to introduce a new class of azo dyes of surprisingly good properties.

Among the many amino compounds which have been used for azo dyes have been numerous heterocyclic compounds. We have now found that the 6-amino derivatives of the carbostyril ring system can be used to prepare azo dyes of remarkable and surprising properties. It was known that this ring system possessed a tautomeric equilibrium:

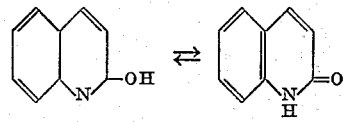

Because of this, there was no way of predicting in advance what effect this ring system would have when used in azo dyes. Some of the properties of the parent compound and its classification as a hydroxyquinoline in most textbooks might lead one to expect results analogous to the ordinary amino quinoline. We have found, however, that the properties of the dyes prepared from 6-aminocarbostyrils differ in shade from aminoquinoline dyes. We suspect, therefore, that the keto form plays a large role and therefore prefer to represent the formula as a ketone, although we do not wish to be restricted to any theory as to structure.

It is an advantage of the present invention that starting from simple and readily obtainable aromatic amines containing a wide variety of substituents, it is possible to prepare azo dyestuffs and pigments which exhibit a great variety of shades ranging from yellow to blue and which have good fastness properties to light and washing. It is another advantage of this invention that it is possible to diazotize these 6-aminocarbostyrils by the normal procedure, no special techniques being needed. It is of further advantage that the diazo compounds prepared therefrom couple readily under normal conditions, again needing no special techniques and can be used in any manner in which diazo compounds are normally used.

The 6-aminocarbostyrils can be prepared from simple aromatic amines by straightforward reactions, permitting the introduction of substituents as desired. Some of these compounds have been known a long time but have never been used before in azo dyes. The substituents which are present in the aromatic amine which is used as the starting material appear in the final carbostyril attached to the benzene ring (ring B) of the system. The amino group becomes the nitrogen of the heterocyclic ring. Substituents can be introduced into the heterocyclic ring (ring C) by the choice of the reagent used to react with the aromatic amine.

In general, the compounds of the present invention are prepared as follows: the aromatic amine is reacted with an acylacetic ester to give an acylacetarylide.

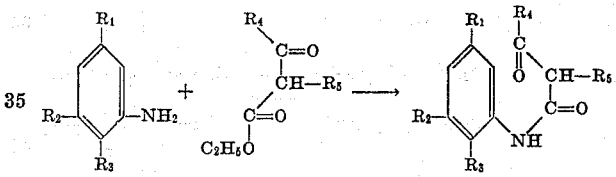

If the acylacetic ester is ethyl acetoacetate, it may be replaced by diketene.

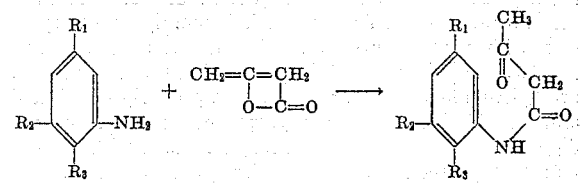

The acylacetarylides on treatment with sulfuric acid readily ring close to the 4-substituted carbostyrils in which the hydrocarbon part of the acyl group becomes the 4-substituent.

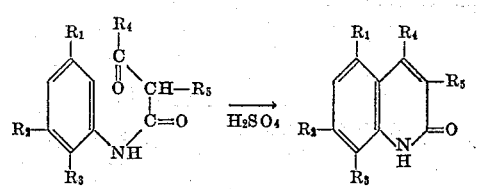

For example, a benzoylacetanilide will give a 4-phenylcarbostyril, while a propionylacetanilide will give a 4-ethylcarbostyril.

If an alpha-substituted acylacetic ester is used, the alpha-substituent becomes the 3-substituent ($R_5$). For example, alpha-methylacetoacetic ester will give a 3,4-dimethylcarbostyril. Similarly, alkyl groups in the 3,4-positions may be joined to form a polymethylene ring. For example, aniline with cyclohexanone 2-carboxylic ester leads after ring closure, to 3,4-tetramethylenecarbostyril:

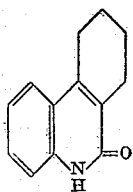

If one desires a carbostyril unsubstituted in the 4-position, one may start with formylacetic ester or ethoxymethyleneacetic ester. Thus, the substituents which can be so introduced include alkyl, aryl, aralkyl, and polymethylene, and the broad scope of the invention covers, therefore, hydrocarbon radicals which may, of course, be further substituted.

Carbostyrils are known to nitrate in the 6-position, and it has been found that substituted carbostyrils containing substituents in the benzene ring do so quite readily. Thus, by starting with an aromatic amine which has the 2- and 4- positions open, it is possible to obtain the corresponding 6-aminocarbostyril from which the dyes of the present invention are prepared. The nitration of these carbostyrils can be illustrated schematically by the following equation in which the R's are hydrogen or substituents to be present in the final carbostyril as indicated:

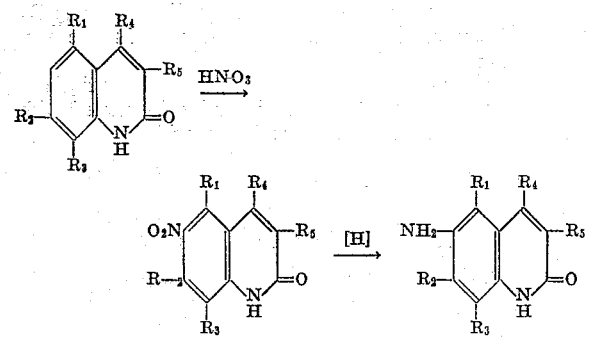

The variation of the substituents $R_4$ and $R_5$ by varying the acylacetic ester has already been indicated. To vary the substituents $R_1$, $R_2$ and $R_3$, it is merely necessary to start with a properly substituted aromatic amine. Thus, to introduce simple substituents such as alkyl, alkoxy, aralkyl, and halogen, one starts with a properly substituted aniline. To introduce an aryl group, one starts with a diphenyl derivative such as 2-phenylaniline or with another aminodiaryl such as 2-(1- or 2-naphthyl)-aniline. To introduce a cyclic residue, it is necessary to start with a polycyclic amine. For example, alphanaphthylamine may be reacted with acetoacetic ester to give the arylide which cyclizes readily as indicated below to give 4-methyl-7,8-benzocarbostyril:

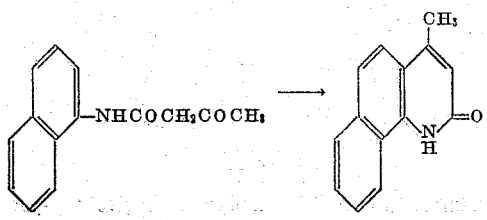

Substituents in the two benzene rings can be introduced by starting with a substituted alpha-naphthylamine. It is necessary, however, to have the adjacent beta position and the para-alpha position open to permit, first, ring closure and then nitration. Similarly, 1-aminoanthracene leads to 4-methyl-7,8-(2,3-naphtho) carbostyril.

Depending on the nature and position of the substituents in the final base, varying shades are obtainable when these bases are coupled into the usual coupling components. The dyes from the 6-aminocarbostyrils show a surprising depth of shade, color value, and other fastness properties, when compared with those from isomeric aminocarbostyrils. It is not known why this should be so, and we are unable to explain why dyes from 5-amino- and 7-aminocarbostyrils are nowhere nearly as good as those from the 6-aminocarbostyrils.

While a great variety of shades are obtainable in azo dyes, most of the dyes of this type have shades of yellow, orange, and red. Only a very few aromatic amines are known which give the deeper shades, such as the blues. Commercially, there are only four such "blue bases" on the market. It is, therefore, a major contribution to the art to add another type of structure to the list of amines which will give blue shades. When coupled into the usual coupling components for blue azo dyes, such as the anilides of 2-hydroxy-3-naphthoic acid, the 8-alkoxy-6-aminocarbostyrils give clear, red shades of blue which are not obtainable by the use of the usual "blue bases."

It is an advantage of the present invention that the preparation of such dyestuffs does not require special techniques but can be carried out by methods known to the art. The 6-amino-carbostyrils can all be readily diazotized and can then be coupled with a wide variety of coupling components. For example, coupling components of the azoic type, such as arylides of acetoacetic acid or 2-hydroxy-3-naphthoic acid, form insoluble dyestuffs or pigments which can be prepared in bulk. Alternatively, the textiles can be padded with an alkaline solution of such an arylide and treated with the diazo solution to form the insoluble dyestuff on the fiber. It is also possible to convert the diazo to a diazoamino compound or other stable derivative for incorporation with a suitable coupling component in an alkaline printing paste, to be applied to goods and followed by acid development to form the dyestuff on the fiber. Among the azo color coupling components which can be used for this purpose are such compounds as beta-naphthol and derivatives such as 8-amino-2-naphthol, 8-acetylamino-2-naphthol and 4-benzoyl-1-naphthol, pyrazolones and hydroxybenzofluorenes and the various N-substituted amides such as arylides of 2-hydroxy-3-naphthoic acid, of 2-hydroxy-3-anthroic acid, of methyl and dimethyl salicylic acid, of hydroxycarbazole carboxylic acids, of hydroxybenzocarbazole carboxylic acid, of hydroxybenzacridine carboxylic acid, of hydroxydibenzofuran carboxylic acid, of hydroxydibenzothiophene carboxylic acid, of acetoacetic acid and of benzoylacetic acid and the like. The arylide group in the coupling component may be a simple aromatic group such as the radical of aniline or of an aniline derivative or of a naphthylamine or it may be the radical of a heterocyclic amine such as, for example, an amine of the benzothiazole series or of a diamine of the diphenyl sulfone series.

The 6-aminocarbostyrils may also be used for the preparation of water-soluble dyestuffs suitable for dyeing vegetable or animal fibers. In this case a great many of the customary phenolic or aminic coupling components may be used. The coupling component, however, must carry at least one sulfonic acid group in case the diazo component has none. Illustrative examples of such coupling components include salicylic acid, resorcinol, metaphenylenediamine and a large number of naphthol sulfonic acids such as, for example, R-acid, G-acid, Cleve's acid, J-acid, Gamma-acid, J-acid urea and J-acid imide, H-acid and many others. Pyrazolones such as sulfonic acid derivatives of 1-phenyl-3-methylpyrazolone-5 may also be used.

The 6-aminocarbostyrils fluoresce green-blue in ultraviolet light and may be used as intermediate in the manufacture of textile brighteners. These compounds also have antioxidant properties. The invention will be more fully illustrated by the following examples which are meant to be illustrative only and not by way of limitation. All parts are by weight unless otherwise specified.

EXAMPLE 1

*7,8-benzo-4-methyl-6-nitrocarbostyril*

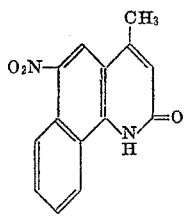

A solution of 10.0 parts 7,8-benzo-4-methylcarbostyril in 262.5 parts acetic acid and 4.5 parts 96% nitric acid is boiled under reflux until no more product separates from the solution. Filtration gives an excellent yield of yellow product which crystallizes from acetic acid or Cellosolve in bright yellow crystals.

EXAMPLE 2

*6-amino-7,8-benzo-4-methylcarbostyril*

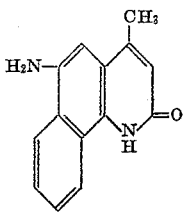

A slurry of 10.2 parts 7,8-benzo-4-methyl-6-nitrocarbostyril in 120 parts alcohol is shaken with palladium charcoal catalyst under hydrogen pressure until reduction is complete. The crude slurry is filtered, the cake dissolved in dilute hydrochloric acid, filtered from the catalyst and reprecipitated with ammonia giving a high yield of olive yellow amine which can be recrystallized from o-dichlorobenzene or Cellosolve.

EXAMPLE 3

The shades of dyes obtained by coupling the diazo of 6-amino-7,8-benzo-4-methylcarbostyril with various coupling components are shown in the following table:

| Amine component | Coupling component | Shade |
| --- | --- | --- |
| 6-amino-7,8-benzo-4-methylcarbostyril. | 2-naphthol-3-carboxanilide | Blue. |
| | 2'-methoxy-2-naphthol-3-carboxanilide. | Reddish-blue. |
| | Bis-acetoacetotolidide | Yellow-brown. |
| | 4'-chloro-2-hydroxy-3-carbazolecarboxanilide. | Brown. |

Other carbostyrils and the azo dyes derived therefrom are described and claimed in copending applications Serial No. 327,667, filed December 23, 1952, and Serial No. 406,357, filed January 26, 1954, now Patent No. 2,754,293.

We claim:

1. New compounds of the formula:

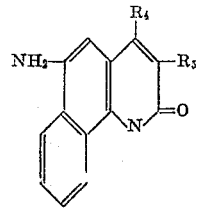

in which $R_4$ is a member of the group consisting of hydrogen lower alkyl and phenyl radicals; $R_5$ is a member of the group of hydrogen and lower alkyl radicals and $R_4$ and $R_5$ together may form a cyclohexene ring.

2. New compounds of the formula:

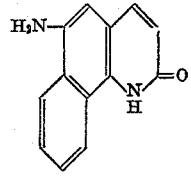

in which the heterocyclic ring of the benzocarbostyril nucleus carries on the 3 and 4 positions substituents chosen from the group consisting of hydrogen, alkyl, aryl, aralkyl and polymethylene groups.

3. The new compound of the formula:

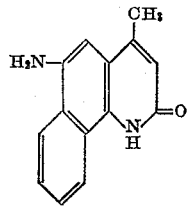

References Cited in the file of this patent

Beil: Vol. 21 (4th ed.), 1935, System No. 3187, p. 339.